UNITED STATES PATENT OFFICE 2,319,121

REACTION OF HYDROCARBON SULPHONYL HALIDES WITH ALCOHOLS

Arthur L. Fox, Woodstown, N. J., assignor to E. I. du Pont de Nemours & Company, Wilmington, Del., a corporation of Delaware No Drawing. Application November 12, 1940, Serial No. 365,376

5 Claims. (Cl. 260—513)

This invention relates to the preparation of aliphatic and alicyclic sulphonic acids and their salts from the corresponding sulfonyl halides, such as chlorides and bromides. More particularly it relates to the preparation of such compounds from the corresponding sulphonyl chlorides and alcohols.

This invention has for an object the conversion of saturated hydrocarbon sulphonyl halides such as chlorides and/or bromides to the corresponding sulphonic acids. A further object is to provide high molecular saturated aliphatic and/or alicyclic sulphonic acids and their salts free from inorganic salts. A further object is to provide a new method of producing free organic sulphonic acids or salts which are not admixed with other electrolytes. A still further object is to provide a new use for volatile aliphatic monohydric alcohols. Still other objects are to provide new surface active compositions free from inorganic electrolytes and an economical method of obtaining such products. Still other objects will be apparent from the following disclosure.

It has been found that saturated aliphatic sulphonyl halides and alicyclic sulphonic halides such as chlorides and bromides can be readily converted into sulphonic acids by reacting them with alcohols. In some instances, a small amount of esters of the sulphonic acids is formed but as a general rule the predominant reaction is one in which free sulphonic acids are formed. The formation of the free acids is quite surprising since one would ordinarily except the formation of esters only. The main reaction takes place in accordance with the following equation:

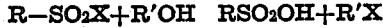

R—SO₂X+R′OH  RSO₂OH+R′X

While the reaction takes place in the manner described above with alcohols in general it has been found that the lower saturated volatile monohydric aliphatic alcohols give the best results. The reaction proceeds more smoothly, better yields are obtained, volatile by-products are formed, and ester formation is repressed.

In an important aspect of the invention sulfonyl chlorides of the aforementioned type which contain at least 4 carbon atoms are reacted with methyl or ethyl alcohol under conditions of reflux until the reaction mass becomes soluble in a clear solution of alcohol. The alcohol is then removed and the free sulphonic acids recovered. The free sulphonic acids can be converted into salts by adding a salt-forming compound to the reaction product. By this procedure a product which is free from chloride salts is obtained. The neutralization step is preferably carried out by adding the free sulphonic acids to an aqueous solution and admixing a salt-forming compound.

The processes hereof may be used with a wide variety of saturated hydrocarbon sulphonyl chlorides which can be obtained in various manners and from various sources. Thus, it can be applied to normal, secondary, tertiary and iso alkane sulfonyl chlorides of 1 to 24 and more carbon atoms, to mixtures of such sulphonyl chlorides, and to the more complex mixtures of sulphonyl chlorides obtainable from petroleum oils and waxes. A number of suitable long chain alkane sulphonyl chlorides and their preparation are set forth in U. S. Patents 2,146,744, 2,147,346 and 2,142,934.

An important embodiment of the invention resides in converting the sulphonyl chloride mixtures obtainable from reacting normally nongaseous saturated aliphatic hydrocarbons with admixed sulphur dioxide and chlorine while irradiating the reaction zone with light of 1800 to 7000 Å and from reacting such hydrocarbons with sulfuryl chloride in the presence of an organic catalyst while irradiating the reaction zone with light of 1800 to 7000 Å. Suitable catalysts for promoting the introduction of sulphonyl chloride groups include heterocyclic nitrogen bases, e. g. pyridine, piperidine, quinoline, etc.

The invention is of particular utility for converting mixtures of normally nongaseous saturated aliphatic sulphonyl chlorides and alicyclic hydrocarbon sulphonyl chlorides which contain chlorine atoms attached to carbon. Such products may be prepared by the above processes and may contain from 0.05 to 1% and more of chlorine attached to carbon.

When a non-gaseous aliphatic or cycloaliphatic hydrocarbon or a mixture of such hydrocarbons or predominating in such hydrocarbons is reacted with gaseous sulphur dioxide and gaseous chlorine, especially at a temperature below the decomposition point of the formed organic sulphonyl chlorides in the manner set forth in U. S. Patents 2,046,090 and 2,202,791, a rather complex mixture is formed, which usually contains in varying proportions hydrocarbon monosulphonyl chlorides, chlorohydrocarbon monosulphonyl chlorides, hydrocarbon polysulphonyl chlorides, chlorohydrocarbon polysulphonyl chlorides and chlorohydrocarbons. The proportion of products in the mixture and the amount of chlorine substitution products can be varied somewhat by varying the proportions of sulphur dioxide to chlorine, the rate of flow, the intensity of the actinic light used to accelerate the reaction, pressure, and temperature conditions.

The invention will be further illustrated, but is not intended to be limited by the following examples in which the parts stated are parts by weight:

Example I

One hundred parts of a mixture of Asiatic wax sulphonyl chlorides obtained by treating Asiatic wax with a mixture of sulphur dioxide and chlorine in the presence of light and containing 11.11% sulphur and 25.8% chlorine and comprising hydrocarbon primary- and secondary- mono- and poly- and chloro-mono- and poly-sulphonyl chlorides was refluxed with 400 parts of ethyl alcohol. No appreciable reaction occurred in the cold, but by the time refluxing temperature had been reached, a vigorous evolution of ethyl chloride was occurring and this kept the alcohol refluxing gently for a considerable period of time. The reaction mass was refluxed for 2 hours and became completely soluble in a clear solution of alcohol, but on cooling a small amount of an oil separated out which consisted of the unreacted Asiatic wax and chlorinated Asiatic wax which were obtained in the treatment of wax with sulphur dioxide and chlorine. The alcoholic solution of the sulphonic acid was evaporated until all of the alcohol was removed. The residue weighed 79 parts and was water-soluble, thus proving it to be a free sulphonic acid. It contained 10.74% sulphur and 12.79% chlorine which latter was not ionizable.

Example II

One hundred parts of a mixture of primary and secondary and chloro-mono- and poly-sulphonyl chlorides obtained by treating cetane with sulphur dioxide and chlorine and containing 12.21% sulphur and 23.65% chlorine was refluxed with 200 parts ethyl alcohol for 12 hours. The alcohol was evaporated under vacuum on a steam bath and the dark colored residual oil contained 9.84% chlorine and 10.45% sulphur. It was predominantly soluble in water and consisted essentially of sulphonic acids corresponding to said sulphonyl chlorides. Small amounts of unreacted cetane and chlorinated cetane were present.

Example III

Three hundred parts of a mixture of heptane primary and secondary chloro-, mono- and poly-sulphonyl chlorides obtained by treating n-heptane with sulphur dioxide and chlorine and containing 15.92% sulphur and 29.5% chlorine was refluxed with 900 parts of methyl alcohol for 3 hours. The alcohol was distilled off on a steam bath and the residue was predominantly soluble in water. This free sulphonic acid could not be vacuum distilled at 10 mm. pressure as it decomposed.

Example IV

Six hundred parts of a purified mineral oil having a distillation range of 266–309° C., a specific gravity of 0.8040 at 15.5° C. compared to water at 15.5° C., a Saybolt Universal viscosity of 37 seconds at 100° F. and a refractive index of 1.444 at 20° C. was treated with a gaseous mixture of 206 parts of sulfur dioxide and 170 parts of chlorine over a period of two hours. The oil gained 200 grams in weight and approximately 45–50% of the oil was converted to a mixture of sulphonyl chlorides and chlorsulphonyl chlorides. 513 parts of the mixture of unreacted oil and sulphonyl chlorides was refluxed for sixteen hours with 230 parts of 95% ethyl alcohol. Ethyl chloride was given off during the reaction. The resulting mixture was diluted with 2000 parts of water and warmed to 65° C. and poured into a separatory funnel. The unreacted oil separated as a top layer. The lower aqueous layer was withdrawn and neutralized with 34 parts of sodium hydroxide. The resulting solution of aliphatic sodium sulphonates and chloro-aliphatic sodium sulphonates was evaporated to dryness. 219 parts of a waxy brown solid was obtained which was completely soluble in alcohol and in water.

In place of the specific mixtures of sulphonyl chlorides set forth in the above examples can be substituted other pure or mixtures thereof of sulphonyl chlorides having the characteristics set forth above. Thus, methyl, ethyl, propyl, butyl, normal pentyl-, hexyl-, heptyl-, octyl-, nonyl-, decyl-, dodecyl-, hexadecyl-, tetradecyl-, etc. sulphonyl chlorides and the corresponding secondary, iso and branched chain sulphonyl chlorides can be used. Likewise, cyclohexane-monosulphonyl chloride, cyclohexane disulphonyl chloride and mixtures of such chlorides, menthane, camphane, terpane, sulphonyl chlorides, naphthenyl sulphonyl chlorides, etc. may be used. Suitable compounds and mixtures of the last-mentioned types are set forth in U. S. Patents, 2,174,505, 2,174,506, 2,174,507, 2,174,508, 2,174,509 and 2,197,800. The corresponding bromides of the above can be similarly used.

In addition to the preferred alcohols, methyl and ethyl which are described in the examples, others including isopropyl, butyl and higher alcohols can be used. Polyhydric alcohols such as glycol and glycerine are also of utility for this purpose.

Various neutralizing agents in addition to those set forth in the examples, can be used. For instance, various salts of the sulphonic acids may be obtained by carefully neutralizing the free sulphonic acids produced by this invention. In addition to the sodium hydroxide employed in the examples other alkali metal hydroxides such as potassium, caesium, etc. may be used. Likewise, the alkaline earth hydroxides and oxides may be employed. An aqueous solution of ammolium hydroxide may be used to yield the ammonium salt. Substituted ammonium salts or amine salts may be obtained by neutralizing the free sulphonic acid with aqueous solutions of aliphatic, cycloaliphatic, aromatic and heterocyclic amines, such as dimethylamine, ethylamine, diethylamine, and triethanolamine, piperidine, diethyl-cyclohexylamine, pyridine, aniline, toluidine, xylidines, b-naphthylamine, etc. Thus, the amine salts of the sulphonic acids may be obtained. Also, the strong quaternary ammonium bases such as tetra-methyl-ammonium-hydroxide and tetraethyl-ammonium-hydroxide may be used for the neutralization. The resulting products would be the tetra-methyl-ammonium salt or the tetra-ethyl-ammonium salt of the hydrocarbon sulphonic acid. The salts can be recovered in various ways, e. g. evaporation of solutions, spray drying, drum drying and other conventional means.

The proportions of the reactants may vary somewhat, but in general the amount of alcohol used should be at least equivalent to the number of sulphonyl chloride groups in the other reactant. An excess of about 50% is most advantageous.

The temperature and pressure may be varied over a wide range. A practical range is from room temperature up to the decomposition point of the organic sulphonyl chlorides. A preferred range is 30 to 100° C. at normal pressure. With lower alcohols it is generally advisable to carry out the reaction at atmospheric pressure or above. With the higher alcohols it is ofttimes desirable to use reduced pressures, e. g. 100 to 500 mm. When pressure is used the alkyl halides can be removed by distillation at normal or reduced pressures.

It will be apparent from the above that this invention has considerable utility. It may be applied to a wide variety of hydrocarbon sulphonyl chlorides and enables one to obtain sulphonic acids free from inorganic salt impurities.

A major advantage of the process resides in the fact that it enables organic sulphonic acids to be prepared free from non-organic electrolytes. In the case of the high molecular sulphonic acids which have surface activity in the form of the free acids and water-soluble salts, it enables one to obtain such products in a desirable state of purity. This is of particular importance with the alkali metal salts of the saturated aliphatic sulphonic acids of 12 to 18 carbon atoms since these products can be obtained in an economical manner free from sodium chloride.

As many apparently widely different embodiments of this invention may be made without departing from the spirit and scope thereof it is to be understood that the invention is not to be limited to the specific embodiments herein except as defined by the appended claims.

What is claimed is:

1. The process which comprises reacting a mixture of saturated aliphatic hydrocarbon sulphonyl chlorides containing at least 5 carbon atoms and combined chlorine attached to carbon with an alcohol in an amount at least equivalent to the number of sulphonyl chloride groups, at a temperature below the decomposition point of said sulphonyl halides.

2. The process which comprises reacting a non-gaseous saturated hydrocarbon with admixed sulphur dioxide and chlorine in the presence of actinic light, reacting the hydrocarbon sulphonyl chlorides formed with an alkyl alcohol of less than 3 carbon atoms in an amount at least equivalent to the number of sulphonyl chloride groups at a temperature between 30° and 100° C. and recovering the sulphonic acids formed.

3. A process as set forth in claim 2 wherein the sulphonic acids are recovered as free sulphonic acids.

4. A process as set forth in claim 2 wherein the sulphonic acids are recovered in the form of their water-soluble salts.

5. The process which comprises reacting mineral oil sulphonyl chlorides containing chlorine attached to carbon with an alkyl alcohol of less than 3 carbon atoms in an amount at least equivalent to the number of sulphonyl chloride groups at a temperature between 30° and 100° C., removing the alkyl halides and neutralizing the sulphonic acids with an alkali metal hydroxide.

ARTHUR L. FOX.